(12) United States Patent
Schmidt et al.

(10) Patent No.: US 10,821,678 B2
(45) Date of Patent: Nov. 3, 2020

(54) ADDITIVE MANUFACTURED MULTI-PORTION ARTICLE

(71) Applicant: United Technologies Corporation, Farmington, CT (US)

(72) Inventors: Wayde R. Schmidt, Pomfret Center, CT (US); Paul Sheedy, Bolton, CT (US); John A. Sharon, West Hartford, CT (US); Dustin D. Caldwell, Portland, CT (US); Slade R. Culp, Coventry, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/185,201

(22) Filed: Nov. 9, 2018

(65) Prior Publication Data

US 2020/0147897 A1    May 14, 2020

(51) Int. Cl.
| | |
|---|---|
| *B29C 65/56* | (2006.01) |
| *B33Y 10/00* | (2015.01) |
| *B33Y 50/00* | (2015.01) |
| *B33Y 80/00* | (2015.01) |
| *B29C 64/386* | (2017.01) |
| *B29C 64/10* | (2017.01) |
| *B22F 3/00* | (2006.01) |

(52) U.S. Cl.
CPC ............ *B29C 65/565* (2013.01); *B22F 3/008* (2013.01); *B29C 64/10* (2017.08); *B29C 64/386* (2017.08); *B33Y 10/00* (2014.12); *B33Y 50/00* (2014.12); *B33Y 80/00* (2014.12)

(58) Field of Classification Search
CPC .................................................. B29C 65/565

USPC ............................................................ 428/57
See application file for complete search history.

(56) References Cited

U.S. PATENT DOCUMENTS

| | | |
|---|---|---|
| 8,383,985 B2 | 2/2013 | Twelves, Jr. et al. |
| 9,857,002 B2 | 1/2018 | Ott et al. |
| 2014/0035423 A1 | 2/2014 | Veronesi et al. |
| 2016/0265362 A1 | 9/2016 | Slavens et al. |
| 2016/0341221 A1 | 11/2016 | Twelves, Jr. et al. |
| 2017/0007406 A1* | 1/2017 | Cui .......................... A61F 2/28 |
| 2018/0185963 A1 | 7/2018 | Ostroverkhov et al. |
| 2018/0209283 A1 | 7/2018 | Kottilingam et al. |
| 2018/0245853 A1 | 8/2018 | Sennoun et al. |
| 2018/0245854 A1 | 8/2018 | Sabo et al. |
| 2018/0258791 A1 | 9/2018 | Kottilingam et al. |

FOREIGN PATENT DOCUMENTS

WO    2015112891 A1    7/2015

OTHER PUBLICATIONS

European Search Report dated Apr. 20, 2020 issued for corresponding European Patent Application No. 19208058.8.

* cited by examiner

*Primary Examiner* — Brent T O'Hern
(74) *Attorney, Agent, or Firm* — Bachman & LaPointe, P.C.

(57) ABSTRACT

An additive manufactured multi-portion article includes a first portion of an article manufactured by a first additive manufacturing process; and a second portion of the article manufactured by a second additive manufacturing process different than the first additive manufacturing process, the second portion attached to the first portion.

13 Claims, 6 Drawing Sheets

FIG. 1

| SFF Process | Materials Options Current and (in development) | Build Accuracy (Feature size) | Build Speed | Internal Voids, Undercuts, Overhangs Possible? | Machine Cost |
|---|---|---|---|---|---|
| Sanders ModelMaker | Wax/plastic (metal, ceramic) | Best (smallest) | Slow | Yes | $60K |
| DTM Selective laser sintering (SLS) | Nylon, plastic, metal, ceramic | Better (small) | Fast | Yes | $200K |
| 3D Systems Thermojet | Wax/plastic | Best (smallest) | Faster | Limited | $50K |
| 3D Printing Binder jetting | Starch, plaster | Good (small) | Fastest | Yes | $60K |
| ExOne ProMetal 3D Printing | Metal | Good (small) | Fast | Yes | $300K+ |
| Stereolithography | Plastic resin (ceramic/metal filled resins) | Better (smaller) | Fast | Yes | $75K+ |
| Laminated Object Manufacturing (LOM) | Paper (metal, ceramic, composite) | Good (small) | Slow | Limited | ? |
| Fused Deposition Modeling (FDM) | Plastic, wax (ceramic, metal) | Good (small) | Fast | Limited | $75K+ |

|  | First portion | Second portion |
|---|---|---|
| Preferred Volumetric Build Rate | <25 in³/hr | >25 in³/hr |
| Most Preferred Volumetric Build Rate | 1-10 in³/hr | >40 in³/hr |
| Preferred Resolution | 100 microns | 0.5-5 mm |
| Most Preferred Resolution | 1-50 microns | 1-2.5 mm |
| Example Process/Material | Metallic LPBF/nickel powder | Wire arc/tool steel |

FIG. 11

ADDITIVE MANUFACTURED MULTI-PORTION ARTICLE

BACKGROUND

The present disclosure relates to additive manufacturing and, more particularly, to an additively manufactured multi-portion article.

Many additive manufacturing methods currently exist, both commercially and in development, yet none offer optimized quality in all of the following categories: overall part size, material, surface finish, dimensional accuracy, volumetric build rate, internal geometries, and cost. Oftentimes, tradeoffs must be reconciled to provide high accuracy features with efficient build time at economical costs.

SUMMARY

An additive manufactured multi-portion article according to one disclosed non-limiting embodiment includes a first portion of an article manufactured by a first additive manufacturing process; and a second portion of the article manufactured by a second additive manufacturing process different than the first additive manufacturing process, the second portion attached to the first portion. The first additive manufacturing process is of a higher resolution than the second additive manufacturing process and the first additive manufacturing process operates at a different volumetric build rate than the second additive manufacturing process, the second portion forms a majority portion of the multi-portion article.

A further aspect of the embodiment includes that the second portion is attachable to the first portion.

A further aspect of the embodiment includes that the second portion is attachable to the first portion via a male-female interface.

A further aspect of the embodiment includes that the second portion is attachable to the first portion via a joint.

A further aspect of the embodiment includes that the second portion is attachable to the first portion via a dovetail joint.

A further aspect of the embodiment includes that the first additive manufacturing process is of a higher resolution than the second additive manufacturing process.

A further aspect of the embodiment includes that the first additive manufacturing process operates at a different volumetric build rate than the second additive manufacturing process.

A further aspect of the embodiment includes that the first additive manufacturing process is of a higher resolution than the second additive manufacturing process and the first additive manufacturing process operates at a different volumetric build rate than the second additive manufacturing process.

A further aspect of the embodiment includes that the second portion is attached to the first portion via the second portion being additively manufactured onto the first portion.

An additive manufactured multi-portion article according to one disclosed non-limiting embodiment includes a first portion of an article manufactured by a first additive manufacturing process; and a second portion of the article manufactured by a second additive manufacturing process less accurate than the first additive manufacturing process, the second portion attached to the first portion.

A further aspect of the embodiment includes that the first additive manufacturing process is of a higher resolution than the second additive manufacturing process.

A further aspect of the embodiment includes that the first additive manufacturing process operates at a different volumetric build rate than the second additive manufacturing process.

A further aspect of the embodiment includes that the first additive manufacturing process is of a higher resolution than the second additive manufacturing process and the first additive manufacturing process operates at a different volumetric build rate than the second additive manufacturing process.

A method of constructing an additive manufactured multi-portion article according to one disclosed non-limiting embodiment includes additive manufacturing a first portion of an article with a first additive manufacturing process; additive manufacturing a second portion of the article with a second additive manufacturing process different than the first additive manufacturing process; and attaching the second portion to the first portion.

A further aspect of the embodiment includes that the additive manufacturing of the first portion is faster than the additive manufacturing of the second portion.

A further aspect of the embodiment includes that the additive manufacturing of the first portion is less accurate than the additive manufacturing of the second portion.

A further aspect of the embodiment includes that attaching the second portion to the first portion comprises mechanical attaching.

A further aspect of the embodiment includes that attaching the second portion to the first portion comprises mechanical attaching via a joint.

A further aspect of the embodiment includes that attaching the second portion to the first portion occurs during the additive manufacturing of the second portion.

A further aspect of the embodiment includes computer modeling the article and determining the second portion and the first portion with respect to the first additive manufacturing process and the second additive manufacturing process.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
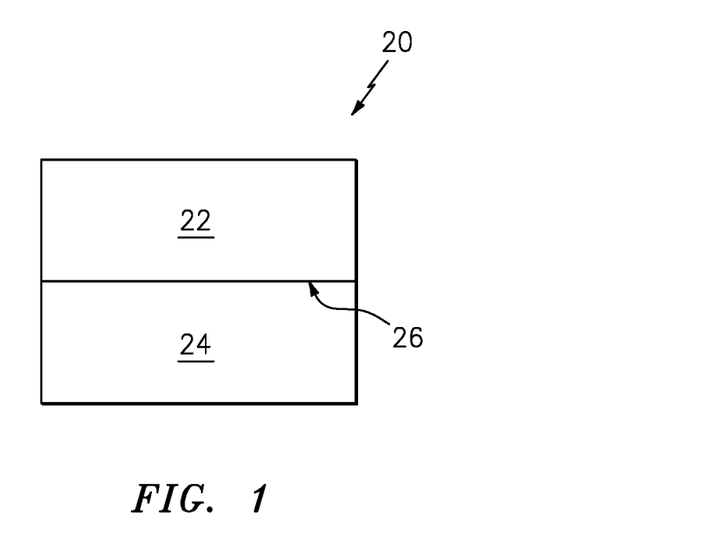
FIG. 1 is a schematic cross-sectional view of a multi-portion additive manufactured article.

FIG. 1 schematically illustrates an additive manufactured multi-portion article 20. The additive manufactured multi-portion article 20 includes a first portion 22 manufactured by a first additive manufacturing process and a second portion 24 manufactured by a second additive manufacturing process different than the first additive manufacturing process, the second portion 24 is attachable to the first portion 22 at an interface 26. The multi-portion article 20 is but one example of an article that may benefit from that disclosed herein, such as an investment casting, a lost wax tool, and or other article applications which may be particularly useful in aerospace and gas turbine engine applications. The multi-portion article 20 may also be used for cast metal objects with interior surface texturing, for example, combustor applications, heat exchangers, fuel filters, desulfurization reactors, reformers, shift convertors, carbon monoxide selective oxidizers, igniters, and others.

Figure 2:
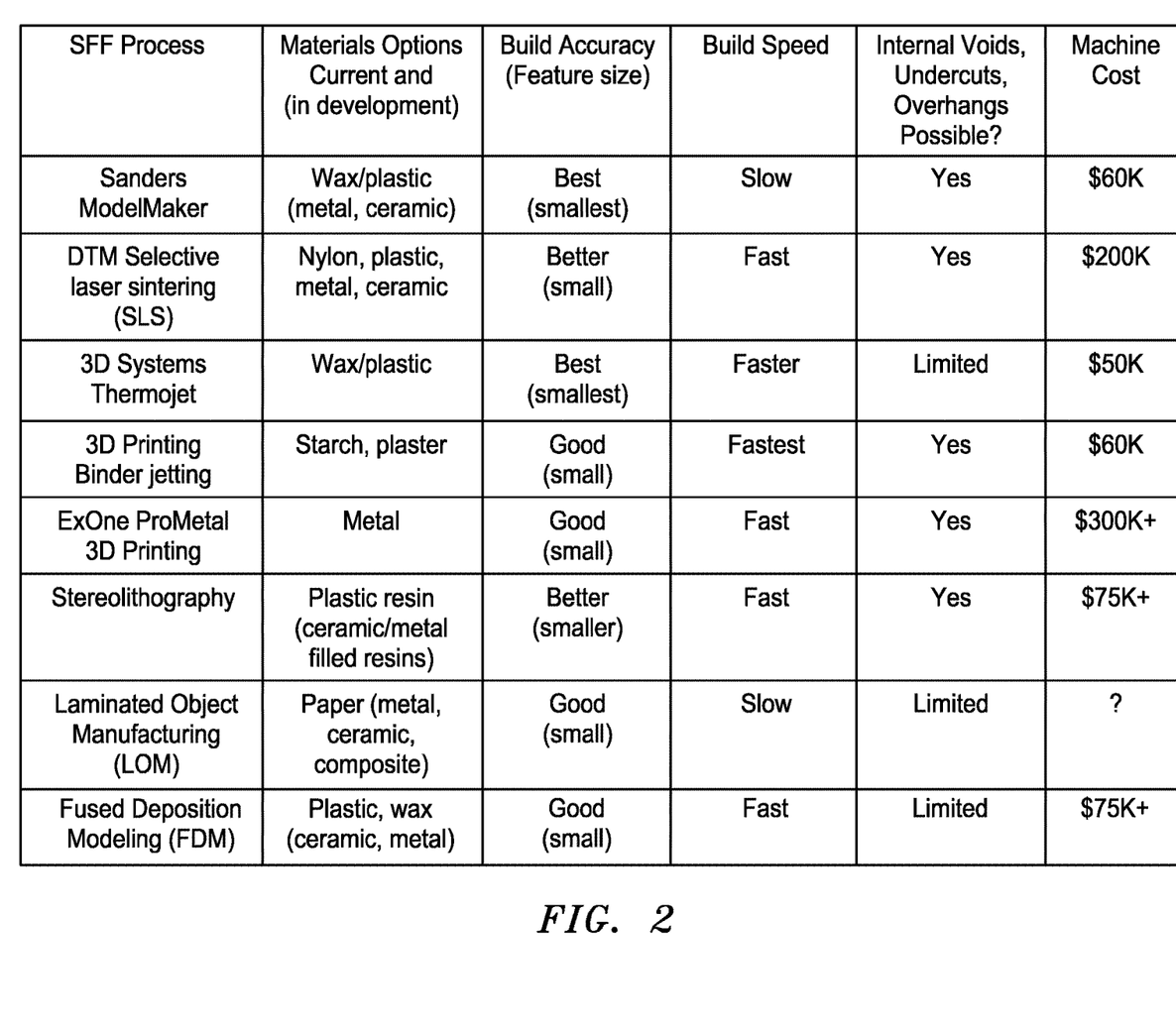
FIG. 2 is a table of example additive manufacturing processes and associated characteristics to facilitate selection.

The additive manufacturing processes fabricate, build or "grow" articles using three-dimensional information such as a three-dimensional computer model. The three-dimensional information is converted into a plurality of slices, each slice defining a cross section of the article for a predetermined height of the slice. The additive manufactured multi-portion article 20 is then "grown" slice-by-slice, or layer-by-layer, until finished. In other examples, the additive manufacture process is performed continuously, without discrete layers, as in Digital Light Synthesis™ or Continuous Liquid Interface Production (CLIP™). In a non-continuous build example, the additive manufacturing process sequentially builds-up layers of atomized powder material that include but are not limited to, Inconel 625 Alloy, 718 Alloy, 230 Alloy, other metal alloys, stainless steel, tool steel, cobalt chrome, titanium, nickel, aluminum, ceramics, plastics and others in atomized powder material form. In other examples, the starting materials can be non-atomized powders, filled or unfilled resins in liquid, solid or semisolid forms, and wire-based materials as would be used in approaches such as Wire Arc Additive Manufacturing (WAAM) for metals and Fused Deposition Modeling (FDM) for polymers. Alloys such as Inconel 625, 718 and 230 may have specific benefit for high temperature environments, such as, for example, environments typically encountered by aerospace and gas turbine engine articles. With reference to FIG. 2, the additive manufacturing processes include, but are not limited to, Solid Freeform Fabrication (SFF) processes, 3-D printing methods, Sanders Modelmaker, Selective Laser Sintering (SLS), 3D systems thermojet, ZCorp 3D printing Binder jetting, ExOne ProMetal 3D printing, stereolithography (SLA), Laminated Object Manufacturing (LOM), Fused Deposition Modeling (FDM), Electron Beam Sintering (EBS), Electron Beam Melting (EBM), Electron Beam Powder Bed Fusion (EB-PBF), Electron Beam Wire (EBW), Laser Engineered Net Shaping (LENS), Laser Net Shape Manufacturing (LNSM), Direct Metal Deposition (DMD), Laser Powder Bed Fusion (L-PBF), Digital Light Synthesis™, Continuous Liquid Interface Production (CLIP™), and Layerwise Ceramic Manufacturing (LCM). Although particular additive manufacturing processes are recited, any rapid manufacturing methods can alternatively be used. Such additive manufacturing processes can be generally categorized as vat photo polymerization, material jetting, binder jetting, material extrusion, powder bed fusion, sheet lamination, or directed energy deposition.

Figure 3:
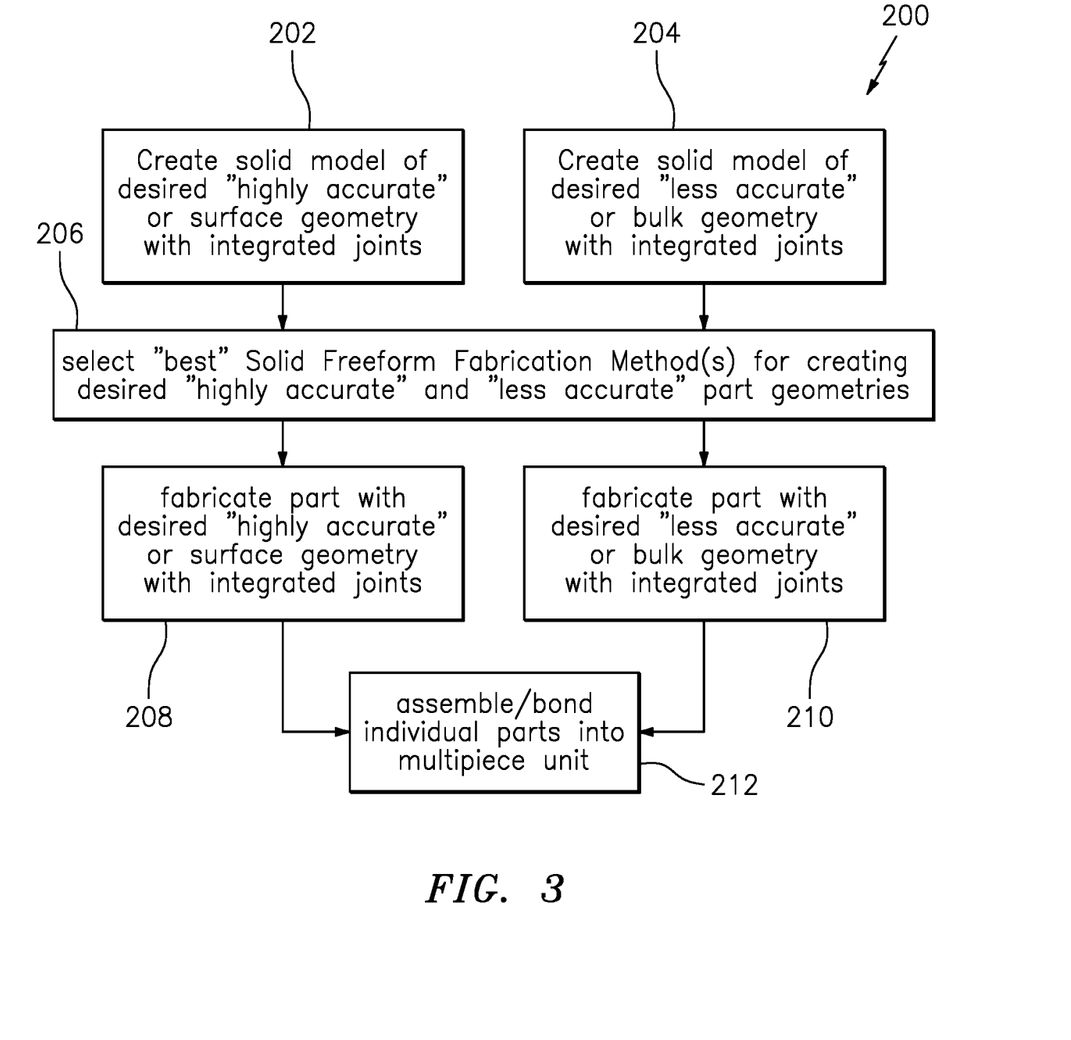
FIG. 3 is a block diagram of a process for additive manufacturing of the example additive manufactured article.

With reference to FIG. 3, one disclosed non-limiting embodiment of a method 200 of constructing the additive manufactured multi-portion article 20 (FIG. 1) is provided. The method 200 is a hybrid process which combines multiple additive manufacturing (AM) or SFF processes to generate articles that can be assembled into a single multi-portion article 20. The method combines the use of a relatively slow, high resolution additive manufacturing method, to produce one article, with a relatively fast, less accurate additive manufacturing method to produce a separate article. It is contemplated that the articles can be assembled in a permanent or temporary fashion. In examples, high resolution may be defined as 1 micron to 1 cm (10000 microns) and low resolution may be defined as greater than 1 cm. High linear build rate may be defined as at least 10 cm per second while low linear build rate can be described as less than 1 cm/sec.

The method 200 initially includes generating a computer model of the first portion 22 with the integrated joint portion of the interface 26 (step 202). The first portion 22 may essentially be a bulk portion of the multi-portion article 20.

Figure 4:
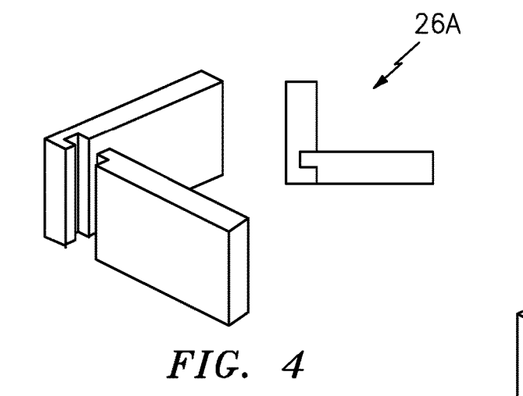
FIG. 4 is an example interface for a multi-portion additive manufactured article.
Figure 5:
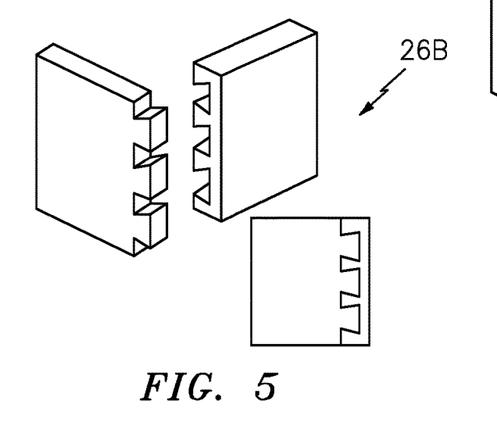
FIG. 5 is another example interface for a multi-portion additive manufactured article.
Figure 6:
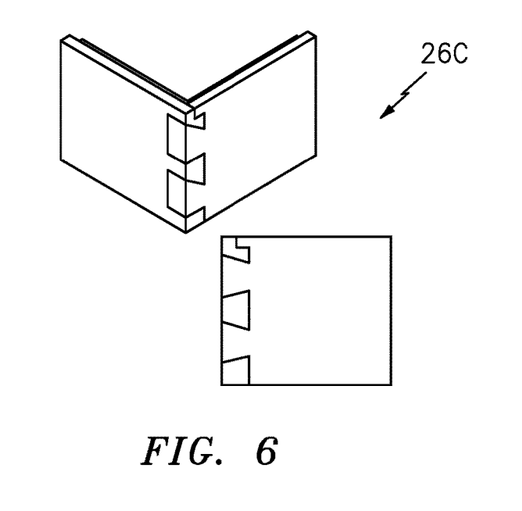
FIG. 6 is another example interface for a multi-portion additive manufactured article.
Figure 7:
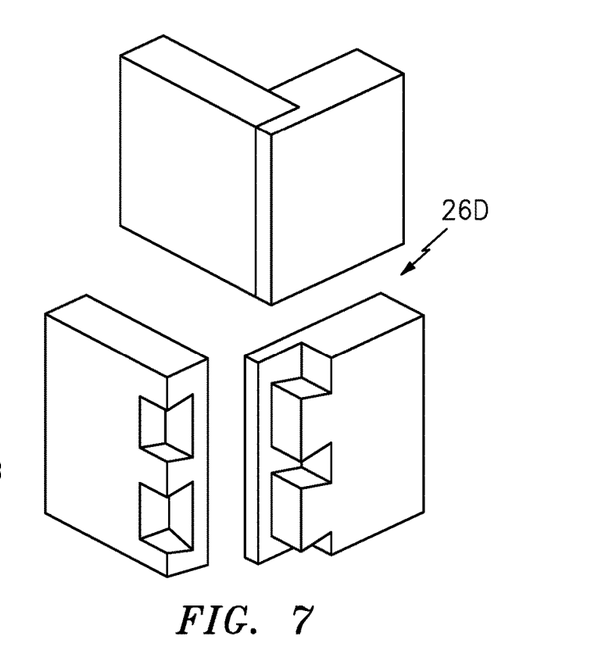
FIG. 7 is another example interface for a multi-portion additive manufactured article.
Figure 8:
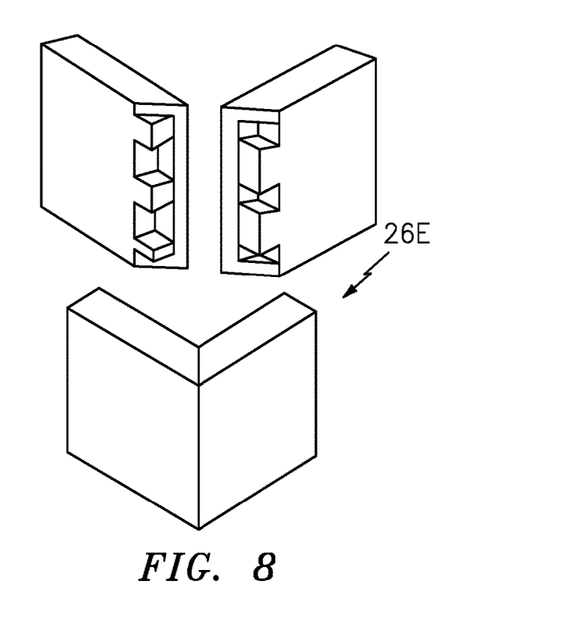
FIG. 8 is another example interface for a multi-portion additive manufactured article.

The interface 26 may be of various constructions such as a male-female mechanical joint, a friction joint, a molecular joint, or other interface. Examples of the mechanical joint includes a groove and rebate joint 26A (FIG. 4), a lapped dovetail joint 26B (FIG. 5), a through dovetail and rebate joint 26C (FIG. 6), a secret lapped dovetail joint 26D (FIG. 7), a secret mitre dovetail joint 26E (FIG. 8), or other mechanical interface. Examples of the molecular interface includes additive manufactured joints in which the second portion 24 is attached to the first portion 22 via the second portion 24 being additively manufactured onto the first portion 22.

Next, a computer model of the second portion 24 with the integrated joint portion that completes the interface 26 with the first article is created (step 204). The second portion 24 may be of a higher resolution and include the more refined and high fidelity feature portion of the multi-portion article 20.

Next, an appropriate additive manufacturing process is selected (step 206) for each portion 22, 24. For example, a relatively fast but less accurate additive manufacturing process would be utilized for the first portion 22 while a relatively slow but of a higher resolution additive manufacturing process would be utilized for the second portion 24. The interface 26 of the individual portions 22, 24 are designed with the integral joining geometries so that the hybrid multi-portion article 20 may be assembled together with the high resolution article portion, e.g., the first portion 22, operating as the working surface.

Next, the portions 22, 24 are additive manufactured (step 208, 210).

Next, the portions 22, 24 are assembled (step 212) at the interface 26 to form the final multi-portion article 20. Alternatively, the interface may be a molecular level interface (FIG. 1) in which the second portion is additively manufactured onto the first portion in step 212.

Figure 9:
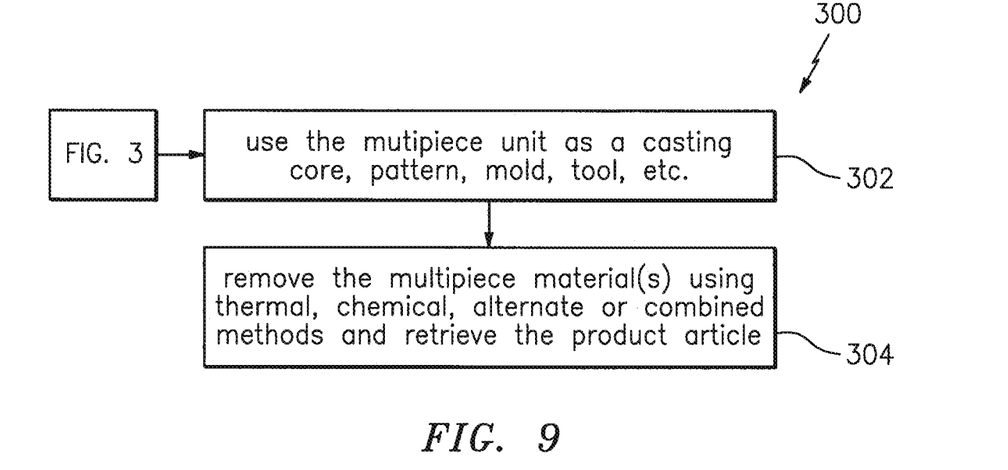
FIG. 9 is a block diagram of a method of using the additive manufactured multi-portion article as a casting core.

With reference to FIG. 9, one disclosed non-limiting embodiment of a method 300 of using the additive manufactured multi-portion article 20 includes forming a casting core (step 302) in accordance with the method of FIG. 3. That is, the final multi-portion additive manufactured multi-portion article 20 may be used as a fugitive or removable, such as in investment casting, lost wax, lost tooling, molding application or tree structure (step 302) then removing (step 304) to provide a mold for the final article.

Figure 10:
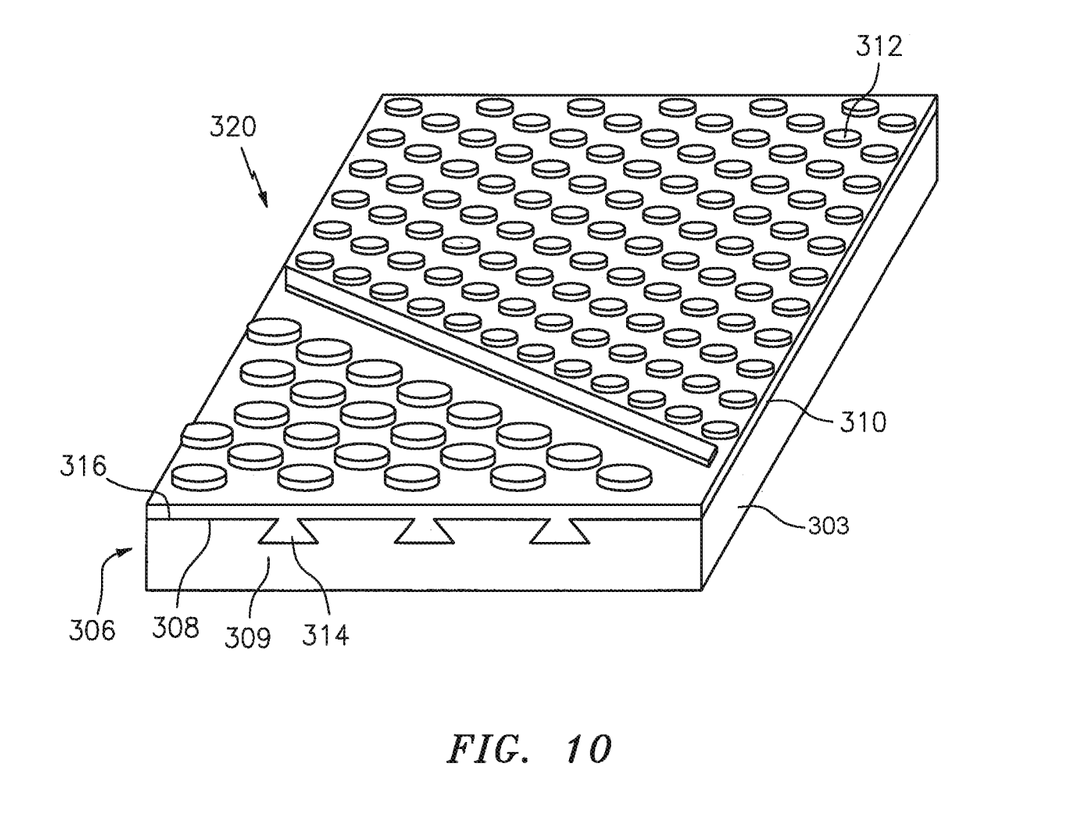
FIG. 10 is a schematic cross-sectional view of another embodiment of a multi-portion additive manufactured article.
Figure 11:
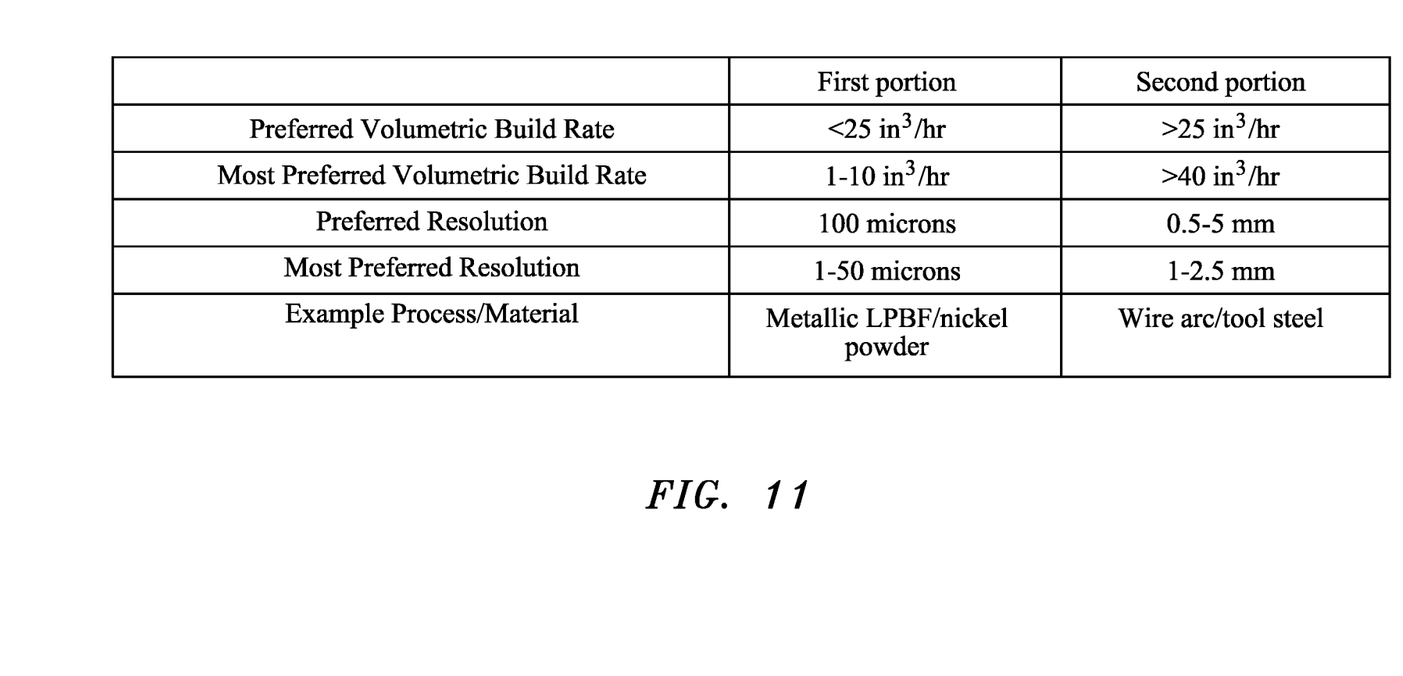
FIG. 11 is a table of the characteristics for the multi-portion additive manufactured article of FIG. 10.

With reference to FIG. 10, another disclosed non-limiting embodiment of an additive manufactured multi-portion article 320 (FIG. 11) is represented as a liner panel for a gas turbine engine combustor. The additive manufactured multi-portion article 320 includes a second portion 303 manufactured by a relatively less accurate and rapid additive manufacturing process to essentially provide 90%, e.g., a bulk portion, of the multi-portion article 320. The second portion 303 includes a joint portion 304 of an interface 306, e.g., a multiple of dovetail joints along a surface 308 thereof.

A first portion 310 is manufactured by a relatively of a higher resolution and slow additive manufacturing process to essentially provide 10%, e.g., the detailed portion of the multi-portion article 320 that includes fine details 312 such as heat transfer elements. The first portion 310 includes a joint portion 314 of the interface 306, e.g., the other half of the multiple of dovetail joints along a surface 316 that mates with the surface 308.

The method 200 provides significant time and cost savings by matching performance of each additive manufacturing process to the required quality of individual portions of the multi-portion article.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft", "upper", "lower", "above", "below", and the like are with reference to the normal operational attitude of the vehicle and should not be considered otherwise limiting.

Although the different non-limiting embodiments have specific illustrated articles, the embodiments of this invention are not limited to those particular combinations. It is possible to use some of the articles or features from any of the non-limiting embodiments in combination with features or articles from any of the other non-limiting embodiments.

It should be appreciated that like reference numerals identify corresponding or similar elements throughout the several drawings. It should also be appreciated that although a particular article arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An additive manufactured multi-portion article, comprising:
   a first portion of a metal alloy article manufactured by a first additive manufacturing process; and
   a second portion of the metal alloy article manufactured by a second additive manufacturing process different than the first additive manufacturing process, the second portion mechanically attached to the first portion at an integral joining geometry, wherein the first additive manufacturing process is of a higher resolution than the second additive manufacturing process and the first additive manufacturing process operates at a different volumetric build rate than the second additive manufacturing process, the second portion forms a majority portion of the multi-portion article.

2. The additive manufactured multi-portion article as recited in claim 1, wherein the integral joining geometry is a male-female interface.

3. The additive manufactured multi-portion article as recited in claim 1, wherein the integral joining geometry is a dovetail joint.

4. The additive manufactured multi-portion article as recited in claim 1, wherein the second portion is attached to the first portion via the second portion being additively manufactured onto the first portion.

5. The additive manufactured multi-portion article as recited in claim 1, wherein the volumetric build rate of the first additive manufacturing process is 1-10 in$^3$/hour and the volumetric build rate of the second additive manufacturing process is greater than 40 in$^3$/hour.

6. The additive manufactured multi-portion article as recited in claim 1, wherein the first additive manufacturing process is of a 1-50 micron resolution and the second additive manufacturing process is of a 1-2.5 mm resolution.

7. An additive manufactured multi-portion article, comprising:
   a first portion of an article manufactured by a first additive manufacturing process the first portion forming about 10% of the article; and
   a second portion of the article manufactured by a second additive manufacturing process less accurate than the first additive manufacturing process, the second portion forming about 90% of the article, the second portion mechanically attached to the first portion at an integral joining geometry wherein the first portion and the second portion are additively manufactured of a metal alloy.

8. The additive manufactured multi-portion article as recited in claim 7, wherein the first additive manufacturing process is of a higher resolution than the second additive manufacturing process.

9. The additive manufactured multi-portion article as recited in claim 7, wherein the first additive manufacturing process operates at a different volumetric build rate than the second additive manufacturing process.

10. The additive manufactured multi-portion article as recited in claim 7, wherein the first additive manufacturing process is of a higher resolution than the second additive manufacturing process and the first additive manufacturing process operates at a different volumetric build rate than the second additive manufacturing process.

11. The additive manufactured multi-portion article as recited in claim 7, wherein the article is a liner panel.

12. The additive manufactured multi-portion article as recited in claim 11, wherein the first portion comprises heat transfer elements.

13. The additive manufactured multi-portion article as recited in claim 12, wherein the integral joining geometry is a dovetail.

* * * * *